(12) United States Patent
Mehrnia et al.

(10) Patent No.: US 7,830,949 B2
(45) Date of Patent: Nov. 9, 2010

(54) CROSS CORRELATION CIRCUITS AND METHODS

(75) Inventors: Alireza Mehrnia, Los Angeles, CA (US); Alireza Tarighat-Mehrabani, Los Angeles, CA (US)

(73) Assignee: WiLINX Corporation, Carlsbad, CA (US)

( * ) Notice: Subject to any disclaimer, the term of this patent is extended or adjusted under 35 U.S.C. 154(b) by 858 days.

(21) Appl. No.: 11/706,709

(22) Filed: Feb. 14, 2007

(65) Prior Publication Data

US 2008/0192867 A1 Aug. 14, 2008

(51) Int. Cl.
H04B 1/00 (2006.01)
(52) U.S. Cl. .................... 375/142; 375/150; 375/343
(58) Field of Classification Search .......... 375/130, 375/142, 150, 342–343; 708/319
See application file for complete search history.

(56) References Cited

U.S. PATENT DOCUMENTS

| | | | | |
|---|---|---|---|---|
| 4,586,153 A * | 4/1986 | Hobrough | ................. | 708/422 |
| 4,601,047 A * | 7/1986 | Horwitz et al. | ............. | 370/479 |
| 4,644,523 A * | 2/1987 | Horwitz | ................. | 370/479 |
| 4,707,839 A * | 11/1987 | Andren et al. | ............. | 375/150 |
| 5,315,616 A * | 5/1994 | DeLisle et al. | ............. | 375/150 |
| 5,504,781 A * | 4/1996 | Wolf | ................. | 375/242 |
| 6,282,228 B1 * | 8/2001 | Monroe | ................. | 375/140 |
| 6,668,012 B1 * | 12/2003 | Hershey et al. | ............. | 375/150 |
| 6,714,582 B2 * | 3/2004 | Nakamura et al. | ............. | 375/141 |
| 7,149,266 B1 * | 12/2006 | Imamura et al. | ............. | 375/355 |
| 7,280,623 B2 * | 10/2007 | Gupta et al. | ................. | 375/343 |
| 7,395,291 B2 * | 7/2008 | Yip et al. | ................. | 708/319 |
| 2005/0265463 A1 * | 12/2005 | Lablans | ................. | 375/259 |
| 2006/0198473 A1 * | 9/2006 | Chiodini | ................. | 375/343 |
| 2006/0203888 A1 * | 9/2006 | Moore | ................. | 375/130 |

* cited by examiner

*Primary Examiner*—Jean B Corrielus
(74) *Attorney, Agent, or Firm*—Chad R. Walsh; Fountainhead Law Group PC

(57) ABSTRACT

Embodiments of the present invention include techniques for performing cross correlations. In one embodiment the present invention includes a cross correlation system for use in a communication system comprising a wireless receiver receiving a signal including a first sequence of data values and converting the first sequence of data values into a sequence of digital data values, the wireless receiver further comprising a plurality of cross correlators that each receive the digital data values and cross correlate the digital data values with a corresponding plurality of different binary reference patterns, wherein if the first sequence of data values correlates with one of said plurality of binary reference patterns, one of said cross correlators generates a peak. In one embodiment, the cross correlators are partitioned into stages. In another embodiment, the received data values are loaded into a memory that is shared by the cross correlators to reduce hardware requirements.

21 Claims, 8 Drawing Sheets

600

700

800

|   | m |   |   |   |   |   |   |   |   |   |   |   |   |   |   |   |
|---|---|---|---|---|---|---|---|---|---|---|---|---|---|---|---|---|
|   | 0 | 1 | 2 | 3 | 4 | 5 | 6 | 7 | 8 | 9 | 10 | 11 | 12 | 13 | 14 | 15 |
| n 0 | 1 | 1 | 1 | 1 | -1 | -1 | 1 | 1 | -1 | -1 | 1 | -1 | 1 | -1 | 1 | 1 |
| 1 | -1 | -1 | -1 | -1 | 1 | 1 | -1 | -1 | 1 | 1 | -1 | 1 | -1 | 1 | -1 | -1 |
| 2 | -1 | -1 | -1 | -1 | 1 | 1 | -1 | -1 | 1 | 1 | -1 | 1 | -1 | 1 | -1 | -1 |
| 3 | -1 | -1 | -1 | -1 | 1 | 1 | -1 | -1 | 1 | 1 | -1 | 1 | -1 | 1 | -1 | -1 |
| 4 | 1 | 1 | 1 | 1 | -1 | -1 | 1 | 1 | -1 | -1 | 1 | -1 | 1 | -1 | 1 | 1 |
| 5 | 1 | 1 | 1 | 1 | -1 | -1 | 1 | 1 | -1 | -1 | 1 | -1 | 1 | -1 | 1 | 1 |
| 6 | -1 | -1 | -1 | -1 | 1 | 1 | -1 | -1 | 1 | 1 | -1 | 1 | -1 | 1 | -1 | -1 |
| 7 | 1 | 1 | 1 | 1 | -1 | -1 | 1 | 1 | -1 | -1 | 1 | -1 | 1 | -1 | 1 | 1 |

$PN^8(z) = 1 - z^{-1} + z^{-2} + z^{-3} - z^{-4} - z^{-5} - z^{-6} + z^{-7}$ $PN^{16}(z) = 1 + z^{-1} - z^{-2} + z^{-3} - z^{-4} + z^{-5} - z^{-6} - z^{-7} + z^{-8} + z^{-9} - z^{-10} - z^{-11} + z^{-12} + z^{-13} + z^{-14} + z^{-15}$ ent invention relates to cross correlators, and in particular, to cross correlator techniques for use in communication systems.

CROSS CORRELATION CIRCUITS AND METHODS

BACKGROUND

The present invention relates to cross correlators, and in particular, to cross correlator techniques for use in communication systems.

In communication systems, incoming signals are sometimes cross correlated with reference patterns to extract meaningful information about the incoming signals. This process may be implemented with the use of cross correlators. Cross correlators are electronic circuits wherein data may be compared and a correlation between two data elements obtained. Cross correlators are used in a variety of applications. In a digital application, a sequence of data values, each represented as a plurality of digital bits may be cross correlated with another sequence of data values to determine the correlation between the values (e.g., are the sequences the same or different, and by how much). In wireless communication applications, one sequence of data values may be stored on a system receiving data over a wireless channel. The sequence of data values stored on the receiving system is sometimes referred to as a reference pattern. Data values received over a wireless channel may be cross-correlated with the reference pattern, and the cross-correlation result used for a variety of processing functions.

FIG. 1 illustrates an example of a reference pattern. Reference patterns are comprised of an array of reference values. Generally, these reference values are floating point numbers (e.g., decimals), and each may be represented as digital data values. As an incoming signal is received by a cross correlator, these reference values may be cross correlated with the incoming samples, which may also be represented as digital data values. As data values are received, the sequence of received data may be cross-correlated with the reference pattern. If a peak is generated at the output of the cross correlator, then the sequence of received data being correlated is well correlated with the reference pattern. This is sometimes called a correlation peak.

FIG. 2 illustrates an example of a typical cross correlator circuit. Circuit 200 comprises multipliers 201 through 205, delays 211 through 214, and adders 221 through 224. This example illustrates cross correlation of 128 received data values with a 128 value reference pattern using 128 multipliers, and corresponding delays and adders. The input signal is coupled to a first input of multipliers 201 through 205. The input of multiplier 201 is further coupled to reference value P0 while the output is coupled to the input of delay 211. The input of multiplier 202 is further coupled to reference value P1, while the output is coupled to the input of adder 221. The other input of adder 221 is coupled to the output of delay 211, and the output of adder 221 is coupled to the input of delay 212. The input of multiplier 203 is further coupled to reference value P2, and the output is coupled to the input of adder 222. The input of adder 222 is further coupled to the output of delay 212, and the output is coupled to the input of delay 213. The input of multiplier 204 is coupled to reference value P126, and the output is coupled to the input of adder 223. The other input of adder 223 is coupled to the output of the previous delay in the circuit. The input of multiplier 205 is coupled to reference value P127, and the output is coupled input of adder 224. The other input of adder 224 is further coupled to the output of delay 214, and the output of adder 224 is the output of circuit 200.

Circuit 200 may calculate the correlation between an incoming signal and the reference pattern comprised of reference values P0 through P127. During the first clock cycle, the first data value of the incoming signal ("i0") is received by the plurality of multipliers 201 through 205 and multiplied by the reference values. For instance, multiplier 201 receives the first input sample and reference value P0, multiplier 202 receives the first input sample and reference value P1, and so on up to multiplier 205, which receives the first input sample and reference value P127. The outputs from multipliers 201 through 204 are coupled to delays 211 through 214. These delays are used to delay a received input for one clock cycle. Therefore, the results from multipliers 201 through 204 are not used in the calculation for the output of circuit 200 during the first clock cycle. However, the value stored in delay 214 may be used in calculating the output in the second clock cycle. The result transmitted from the output of circuit 200 for the first input clock cycle is the result of multiplier 205. In the next cycle, the second sample of the incoming signal is received by multipliers 201 through 205. The multiplication results from the first sample stored in delays 211 through 214 may be added to the multiplication results from the second sample during the second clock cycle. For example, adder 224 may add the second sample result generated from multiplier 205 with the first sample result generated from multiplier 204. This result may be transmitted from the output of circuit 200 for the second cycle while the results from the other multipliers may have their results stored in delays 211 through 214. This process may continue until all the samples of the input signal have been processed by cross correlator circuit 200. If 128 received data values (i0 . . . i127) match the 128 reference pattern values (P0 . . . P127), then the output of cross correlator 200 will peak when the last received data value, P127 is received and processed by multiplier 127 and adder 124. If the output signal of circuit 200 contains a correlation peak, then the input signal and the reference pattern are said to be correlated. This may occur if the values match exactly, but cross correlation may also be used as a measure of similarity between the two sequences, and this may be represented by the magnitude of the correlation peak.

However, one problem with the reference pattern shown in FIG. 1 is that when an incoming signal is cross correlated with a floating point number, the cross correlator becomes extraordinarily complex. Floating point numbers require complicated multipliers, which require a high degree of complexity to implement, and are also expensive and bulky. This may increase the size of the cross correlator, and thereby increase the cost. Given the size and complexity of cross correlator circuits, it is desirable to simplify the cross correlator, resulting in savings in size, complexity, and cost. As illustrated below, reducing the complexity of cross correlation circuits is particularly important in complex communication systems such as wireless communication systems.

Thus, there is a need for improved circuits and methods of simplifying cross correlators. The present invention solves these and other problems by providing improved cross correlation circuits and methods.

SUMMARY

Embodiments of the present invention improve cross correlation circuits and methods. In one embodiment the present invention includes a communication system comprising a wireless receiver, the wireless receiver receiving a signal including a first sequence of data values and converting the first sequence of data values into a sequence of digital data values, the wireless receiver further comprising a plurality of cross correlators that each receive the digital data values and cross correlate the digital data values with a corresponding plurality of different binary reference patterns, wherein if the first sequence of data values correlates with one of said plurality of binary reference patterns, one of said cross correlators generates a peak.

In one embodiment, the cross correlator comprises a first cross correlator stage and a second cross correlator stage, wherein the second cross correlator stage comprises N binary reference pattern values and a plurality of single cycle delays, and wherein the first cross correlator stage comprises M binary reference pattern values and a plurality of N cycles. delays.

In one embodiment, the second cross correlator stage comprises N-1 delays, and wherein the first cross correlator stage comprises M-1 delays.

In one embodiment, the cross correlator comprises a first cross correlator stage comprising a memory coupled to receive the digital data values, a register for storing a first plurality of binary reference pattern values, and a plurality of XOR gates, wherein each XOR gate has a first input coupled to receive a digital data value and a second input coupled to receive a binary reference pattern value.

In one embodiment, the present invention further comprises a summing network coupled to the plurality of XOR gates.

In one embodiment, the present invention further comprises a second cross correlator stage coupled the summing network, wherein the second cross correlator stage comprises N binary reference pattern values and a plurality of single cycle delays, and wherein the first cross correlator stage comprises M binary reference pattern values and implements N cycle delays.

In one embodiment, the register is a shift register.

In one embodiment, the memory receives digital data at a first frequency and wherein the shift register is clocked at a frequency of 1/Mth the first frequency.

In one embodiment, received digital data values are stored in said memory row-by-row in a plurality of successive columns.

In one embodiment, rows of said memory are successively coupled to a first plurality of XOR gate inputs and the plurality of reference values are coupled to a second plurality of XOR gate inputs, and wherein said shift register is shifted after all the rows in said memory have been processed.

In one embodiment, the memory further comprises a row control counter clocked at a first frequency and a column control counter clocked at a frequency of 1/Mth the first frequency.

In one embodiment, binary reference patterns are PN sequences.

In another embodiment, the present invention includes a cross correlator for use in a communication system comprising a memory for receiving and storing digital data values, one or more data storage elements for storing reference pattern values, one or more logic circuits for combining the stored digital data values with the stored reference pattern values, and one or more summing networks coupled to the logic circuits.

In one embodiment, the logic circuits comprise a plurality of XOR gates.

In one embodiment, the reference pattern values are binary reference pattern values.

In one embodiment, the data storage elements comprise one or more shift registers.

In one embodiment, the present invention further comprises a second cross correlator stage coupled the summing network, wherein the second cross correlator stage comprises N binary reference pattern values and a plurality of single cycle delays, and wherein the data storage elements store M binary reference pattern values and are shifted every N cycles.

In one embodiment, the memory receives digital data at a first frequency and wherein the shift register is clocked at a second frequency that is an integer fraction of the first frequency.

In one embodiment, received digital data values are stored in said memory row-by-row in a plurality of successive columns.

In one embodiment, memory comprises columns and rows, and wherein the logic circuits each comprise a plurality of XOR gates, and wherein the rows of said memory are successively coupled to a first plurality of XOR gate inputs and the plurality of reference pattern values are coupled to a second plurality of XOR gate inputs, and wherein said reference pattern values are reconfigured after all the rows in said memory have been processed.

In one embodiment, the memory further comprises a row control counter clocked at a first frequency and a column control counter clocked at a second frequency that is an integer fraction of the first frequency.

In another embodiment, the present invention includes a cross correlation method comprising sequentially storing digital data values in a memory, coupling digital data values stored in said memory to a plurality of first inputs of a plurality of programmable inverter stages, coupling a different first reference pattern to a second input of each of the plurality of programmable inverter stages, where in each programmable inverter stage generates a plurality of outputs, and adding the outputs of each of the programmable inverter stages.

In one embodiment, each reference pattern comprises binary values.

In another embodiment, the present invention includes correlating each added output with a different second reference pattern, wherein each second reference pattern comprises N binary reference pattern values, and wherein each first reference pattern comprises M binary reference pattern values.

In one embodiment, the memory receives digital data values at a first frequency and wherein each first reference pattern received at the second input of each of the plurality of programmable inverter stages is reconfigured at a second frequency that is an integer fraction of the first frequency.

In one embodiment, reconfiguring comprises shifting the first reference pattern in a shift register.

In one embodiment, programmable inverters comprise XOR gates.

The following detailed description and accompanying drawings provide a better understanding of the nature and advantages of the present invention.

DETAILED DESCRIPTION

Described herein are improved cross correlator circuits and methods. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include obvious modifications and equivalents of the features and concepts described herein.

Figure 1:
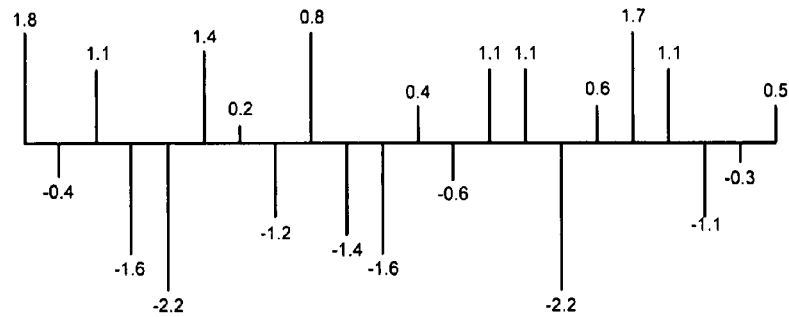
FIG. 1 illustrates an example of a reference pattern.
Figure 2:
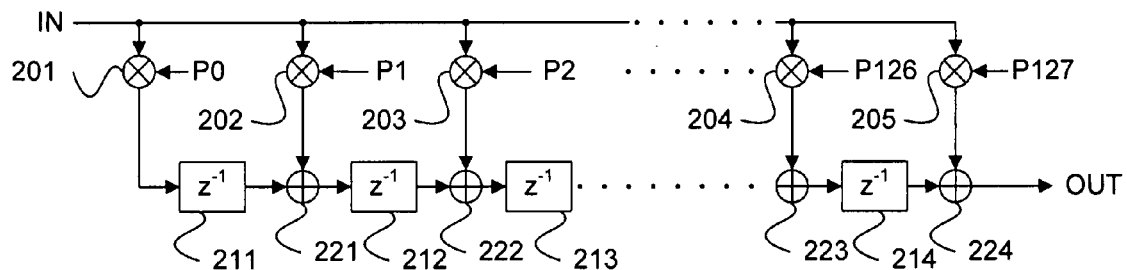
FIG. 2 illustrates an example of a cross correlator circuit.
Figure 3:
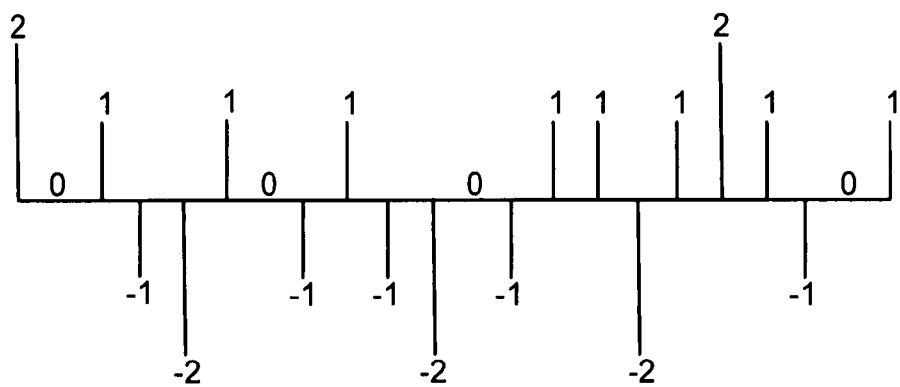
FIG. 3 illustrates an integer reference pattern.

Features and advantages of the current invention include storing modified reference patterns on a receiver and rounding the reference values contained in the reference patterns to a binary set. FIG. 3 illustrates a reference pattern illustrated in FIG. 1 that has been rounded to the nearest integer. One advantage of this is that there is no longer the need for a floating point multiplier. Representation of the reference values as integers requires a maximum number of bits depending on the maximum and minimum integer allowable in the reference pattern. This allows the cross correlator to use fixed-bit multipliers rather than floating point multipliers, equating to savings in complexity and size.

Figure 4:
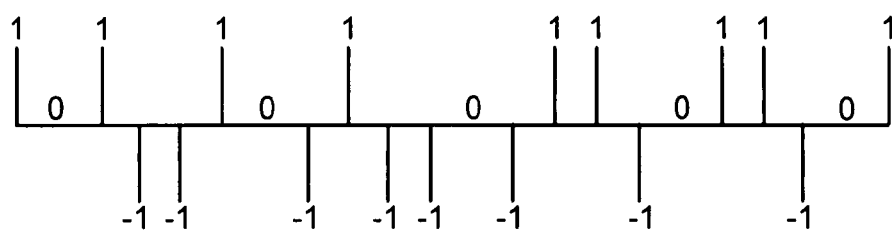
FIG. 4 illustrates a reference pattern rounded to a set.

FIG. 4 illustrates another reference pattern. Here, the reference pattern illustrated in FIG. 1 has been rounded to the nearest integer in a set. The set used in this embodiment is {−1, 0,1}. One advantage of this is that the reference values may be set by a designer to set the complexity of the multipliers since the maximum and minimum reference values will determine the system complexity. In this embodiment, the integer set allows the reference values to be represented by two bits, thereby replacing the floating point multipliers with simple logic (e.g., a multiplexer or a controlled inverter with a reset), for example.

Figure 5:
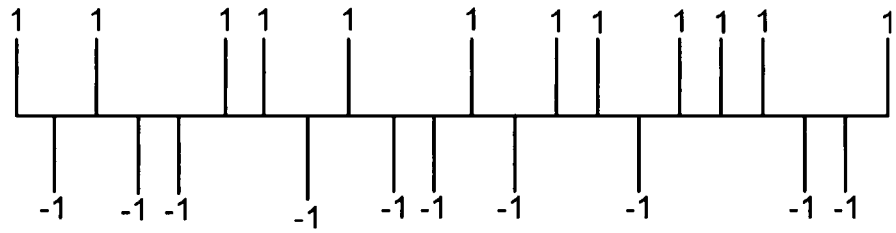
FIG. 5 illustrates a binary reference pattern according to one embodiment of the present invention.

FIG. 5 illustrates binary reference pattern according to one embodiment of the present invention. Here, the reference pattern illustrated in FIG. 1 has its reference values represented as a binary set. The binary set used in this embodiment is {−1, 1}, allowing the reference values to be represented by a single bit. A {−1, 1} set may equate to great savings in complexity because the cross correlator can be comprised of inverters instead of multipliers. Inverters are much simpler circuits requiring fewer transistors than multipliers, which leads to savings in cost, size, and complexity.

Figure 6:
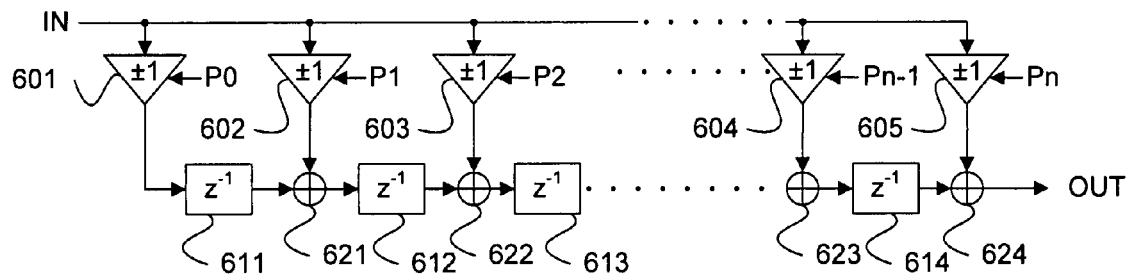
FIG. 6 illustrates a cross correlator circuit according to one embodiment of the present invention.

FIG. 6 illustrates a cross correlator circuit according to one embodiment of the present invention. Circuit 600 comprises inverters 601 through 605, delays 611 through 614, and adders 621 through 624. Cross correlator circuit 600 may correlate any number, n, of sequence values using a corresponding number of circuit elements as illustrated here. In this embodiment, the reference pattern values have been implemented as a binary set {+1, −1}.

Inverters 601-605 represent the implementation of multiplying the incoming signal by either +1 or −1 depending on each reference pattern value P0-Pn. If a reference pattern value is +1, the signal is passed unchanged through the inverter, and if the reference pattern value is −1, the signal is multiplied by −1 (i.e., digitally inverted). It is to be understood that the inverters in FIG. 6 may be hard wired by placing an inverter circuit in each location where the reference value is −1 and having no inverters where the reference value is +1. Alternatively, the inverters may be implemented using programmable circuits (e.g., XOR or XNOR gates) that either invert the input signal or pass the input signal unchanged based on received pattern values. Accordingly, FIG. 6 is meant to be illustrative of the architecture.

The input signal is coupled to the input of inverters 601 through 605. The input of inverter 601 is further coupled to reference value P0. Reference value P0 may be the first one-bit quantized reference value of the reference pattern. The output of inverter 601 is coupled to the input of delay 611. The input of inverter 602 is further coupled to reference value P1. The output of inverter 603 is coupled to the input of adder 621. The other input of adder 621 is coupled to the output of delay 611, and the output is coupled to the input of delay 612. The input of inverter 603 is further coupled to reference value P2. The output of inverter 603 is coupled to the input of adder 622. The other input of adder 622 is further coupled to the output of delay 612, and the output is coupled to the input of delay 613. The input of inverter 604 is further coupled to reference value Pn-1. The output of inverter 604 is coupled to the input of adder 623. The other input of adder 623 is further coupled to the output the previous delay in the circuit, and the output is coupled to the input of delay 614. The input of inverter 605 is further coupled to reference value Pn (i.e., the nth reference value in the reference pattern). The output of inverter 605 is coupled to the input of adder 624. The other input of adder 624 is further coupled to the output of delay 614, and the output comprises the output of correlator circuit 600.

The input signal is transmitted by a bus and enters the plurality of inverters 601 through 605. During the first clock cycle, each inverter receives the first sample of the incoming signal ("i0") along with a reference value and transmits the result as an output. For instance, inverter 601 uses the input signal and reference value P0 to generate the output. In one embodiment, the reference values may be used to determine whether the sample received by the inverters shall be inverted. If the inverter is not enabled, the output is passed to the input. Delays 611 through 614 delay the value received from the inverters for one clock cycle. Therefore, the calculated values from multipliers 601 through 604 may not affect the output of circuit 600 during the first clock cycle. For example, the result of inverter 601 is stored within delay 611 for one clock cycle. Therefore, the result transmitted from the output of circuit 600 for the first input sample is the result of inverter 605.

In the next cycle, the second sample of the incoming signal is received by inverters 601 through 605. The delays 611 through 614 may output the results of inverters 601 through 604 from the first clock cycle in this second clock cycle. The results from the first sample may be added to the results from the second sample. For example, adder 624 may combine the second sample result generated from inverter 605 with the first sample result generated from inverter 604 on the previous cycle. This result may be transmitted from the output of circuit on for the second cycle while the results from the other inverters are stored in delays 611 through 614 for a delay of one clock cycle. This process may continue until all the samples of the input signal have been processed by cross correlator circuit 600. If the incoming signal matches the reference pattern, the value of the output will increase (peak) indicating that a correlation between the input and pattern has been detected. In this example, this occurs when circuit 600 has received a number of samples equal to the number of reference values in the reference pattern.

Figure 7:
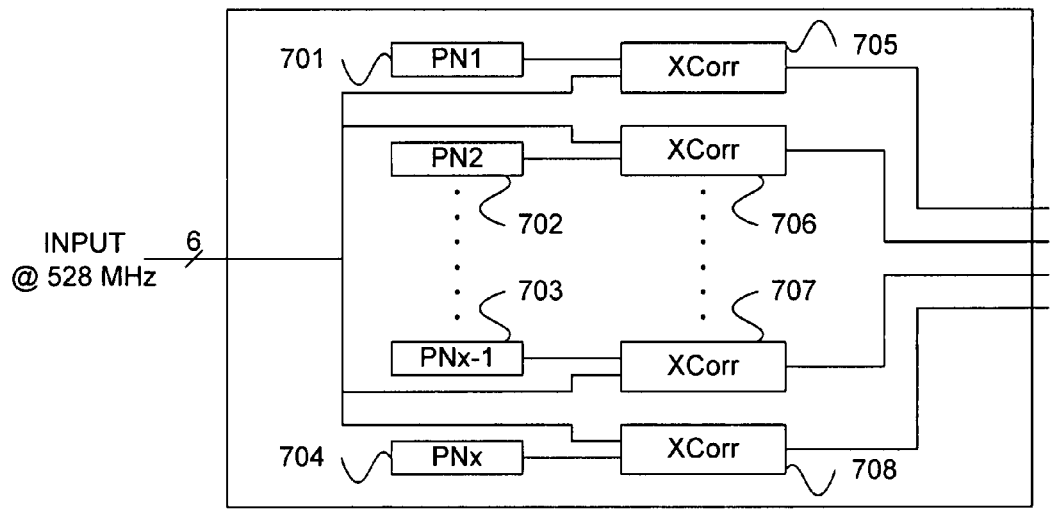
FIG. 7 illustrates a cross correlation system according to one embodiment of the present invention.

FIG. 7 illustrates a cross correlation system according to one embodiment of the present invention. Cross correlation system 700 cross correlates a received input signal against a plurality of reference patterns to determine if one of the reference patterns correlates with the input signal. In one embodiment, these reference patterns binary reference patterns. For example, the reference patterns may be pseudo-random binary ("PN") sequences (+1, −1). System 700 may be included in a receiver in a wireless communication system, for example. The wireless communication system may receive an input signal, convert the signal into digital data, perform data rate conversion (e.g., decimation), and couple the digital data to system 700, for example. An example wireless communication system that may use cross correlator circuits and methods disclosed herein is disclosed in commonly-owned concurrently filed U.S. patent application Ser. No. 11/706,692 now U.S. Pat. No. 7,693,237 entitled Systems and Methods for Synchronizing Wireless Communication Systems, naming Alireza Mehrnia and Alireza Tarighat-Mehrabani as inventors, the disclosure of which is hereby incorporated herein by reference. Embodiments of the present invention may be used in ultra-wideband (UWB) systems including multiband OFDM systems or Wimedia systems, for example.

In this example system, input signal received over the wireless channel is received as 6-bit data values at a rate of 528MHz. The stream of digital data may be coupled to a plurality of cross correlators 705 through 708. In one embodiment, cross correlators 705 through 708 have an architecture as described in FIG. 6. Each of the cross correlators receives a different PN sequence. For example, cross correlator 705 receives PN sequence 701 as an input, cross correlator 706 receives PN sequence 702 as an input, cross correlator 707 receives PN sequence 703 as an input, and cross correlator 708 receives PN sequence 704 as an input. Accordingly, received data may be cross correlated against a plurality of different PN sequences. If the received data correlates with one of the PN sequences (i.e., produces a "correlation peak" at one of the cross correlator outputs), then the receiver may perform certain actions or extract information corresponding to the PN sequence. For example, each PN sequence may correspond to a different frequency hopping pattern. Accordingly, if the received data correlates to PN sequence 701, then the system may be configured to implement a first hopping pattern, but if the received data correlates to PN sequence 704, then the system may be configured to implement another frequency hopping pattern. Of course, a system may use the correlation results to perform a variety of functions. Additionally, it is to be understood that the techniques described herein may be used in wireless communications systems or other data communication systems.

The 128 unquantized floating point reference values would have values between the range −2.5 and 2.5. A cross correlator containing this non-quantized reference pattern may require floating point multipliers to perform the correlation. Therefore, a correlator using the floating point reference pattern may be extraordinarily complex. In the above example, the reference pattern has been quantized to a binary set wherein the reference values are either 1 or −1. By quantizing the reference pattern in this manner, the cross correlator circuit may be simplified as illustrated in FIG. 6. This may result in a savings in the total number of transistors required since the circuit in FIG. 6 requires fewer transistors than an architecture using floating point multipliers. For example, a six-bit inverter may require only 12 transistors while a 6×6 multiplier may require several hundred transistors or more. Therefore, a correlator that correlates an input signal with the binary reference pattern may be simpler and more cost efficient than a correlator that correlates an input signal with a reference pattern represented using floating point numbers.

Figures 8, 9A, 9B:
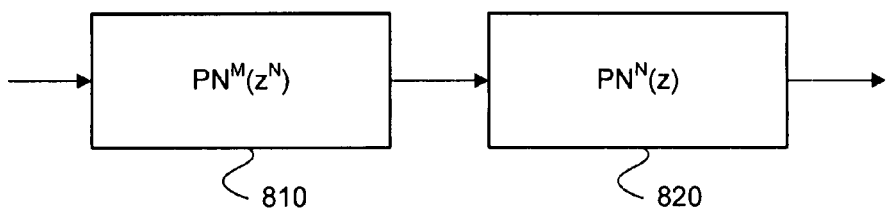
FIG. 8 illustrates a block diagram of a cross correlator circuit according to one embodiment of the present invention.
FIG. 9a illustrates a table of reference values according to one embodiment of the present invention.
FIG. 9b illustrates cross correlation system equations according to one embodiment of the present invention.

FIG. 8 illustrates a block diagram of a cross correlator circuit according to one embodiment of the present invention. Circuit 800 includes a first cross correlator stage 810 coupled to a second cross correlator stage 820. Cross correlator stage 820 includes single cycle (one clock) delay elements and a reference pattern containing "N" reference values. Cross correlator stage 810 includes delay elements each delaying an input by "N" clock cycles and a reference pattern containing "M" reference values. By coupling the two cross correlator stages in series, a reference pattern of total length equal to the multiplication of the number of reference values in correlator 810 and the number of reference values in correlator 820 may be generated. More specifically, a reference pattern of length equal to the multiplication of "M" and "N" may be generated from "M" plus "N" reference values. Accordingly, cross correlation of an input data sequence with a reference pattern of higher complexity may be generated with reduced complexity. For example, if stage 820 includes a reference pattern of eight reference values and stage 810 includes a reference pattern of 16 reference values, then circuit 800 may perform cross correlation of an input with a reference pattern containing 128 reference values even though only 24 reference values have been included in hardware.

FIG. 9a illustrates a table of reference values according to one embodiment of the present invention. The 128 reference values of a reference pattern have been quantized to a binary set of either 1 or −1. The reference values have also been placed in a matrix of size 8 by 16 wherein the first reference value is located at [m=0, n=0], the second reference value is located at [m=0, n=1], and the last reference value is located at [m=15, n=7], where "n" represents the column and "m" represents the row of the memory. Within the matrix, the reference values are equal to the multiplication of the reference values along the edge. For example, reference value 61 located at [m=7, n=5] is equal to the multiplication of the reference value at [m=7, n=0] and the reference value at [m=0, n=5]. As an example, the eight reference values along the first column may represent the reference values in correlator stage 820 in FIG. 8, and the 16 reference values along the first row may represent the reference values in correlator stage 810 in FIG. 8. The reference pattern values in the matrix may be calculated in two steps. First, the reference values of correlator stage 810 may be placed along the first column of the matrix in FIG. 9a, and the reference values of correlator stage 820 may be placed along the first row of the matrix in FIG. 9a. Second, a matrix multiplication may be performed to fill in the interior of the table.

FIG. 9b illustrates cross correlation system equations according to one embodiment of the present invention. These equations may be used to represent the reference pattern matrix illustrated in FIG. 9a. The first equation $PN^8(z)$ is of the first column the matrix. The +1 value located at [m=0, n=7] sets the sign of the constant; the −1 value located at [m=0, n=6] sets the sign of the $z^{-1}$; the +1 value at [m=0, n=5] sets the sign of $z^{-2}$; and so forth. The second equation $PN^{16}(z)$ is of the first row of the matrix. Similar to the first equation, the +1 value located at [m=15, n=0] sets the sign of the constant; the +1 value located at [m=14, n=0] sets the sign of $z^{-1}$; the −1 value located at [m=13, n=0] sets the value of $z^{-2}$; and so forth. These two equations are a simpler method of representing the matrix of FIG. 9a. Furthermore, these equations may be used as a guide in creating the cross correlator that accompanies the reference pattern matrix of FIG. 9a.

Figure 10:
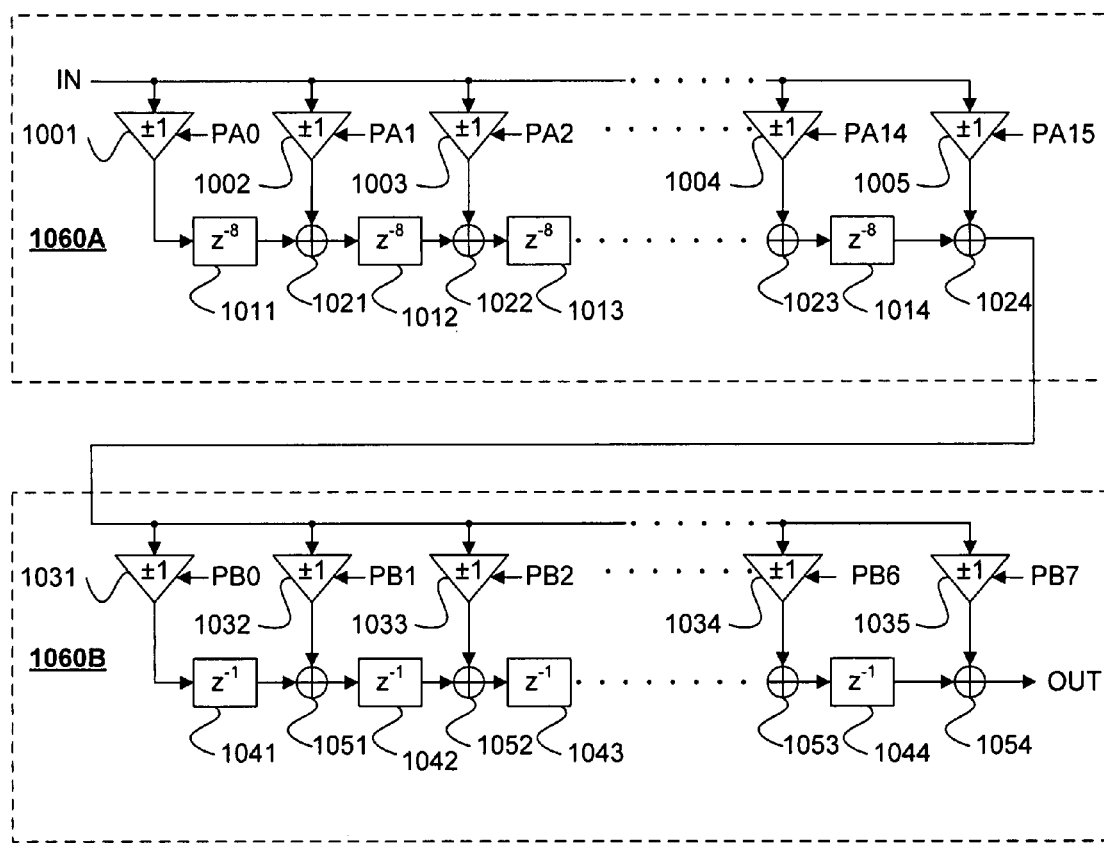
FIG. 10 illustrates a cross correlator circuit according to one embodiment of the present invention.

FIG. 10 illustrates a cross correlator circuit according to one embodiment of the present invention. Circuit 1000 includes a first cross correlator stage 1060A and a second cross correlator stage 1060B. This circuit is an example implementation of the architecture described in FIG. 8. In this example, N=8 and M=16. Stage 1060A includes inverters 1001 through 1005, delay elements 1011 through 1014 that each implement an eight clock cycle delay ("$Z^{-8}$"), and adders 1021 through 1024. The output of stage 1060A is coupled to the input of stage 1060B. Stage 1060B includes inverters 1031 through 1035, delay elements 1041 through 1044 that each implement a one clock cycle delay ("$Z^{-1}$"), and adders 1051 through 1054. An input data stream is received by stage 1060A, which is implemented using a binary reference pattern (i.e., PA0 . . . PAn in the set of {+1, −1}). Accordingly, the input signal is coupled to the input of inverters 1001 through 1005 in stage 1060A. Inverter 1001 represents the implementation of reference value PA0. In one embodiment, PA0 is the first one-bit quantized reference value of a first component or portion of the reference pattern. The output of inverter 1001 is coupled to the input of delay 1011. Inverter 1002 represents the implementation of reference value PA1. The output of inverter 1002 is coupled to the input of adder 1021. Adder 1021 is further coupled to the output of delay 1011 and the input of delay 1012. Inverter 1003 represents the implementation of reference value PA2. The output of inverter 1003 is coupled to the input of adder 1022. Adder 1022 is further coupled to the output of delay 1012 and the input of delay 1013. Inverter 1004 represents the implementation of reference value PA14. The output of inverter 1004 is coupled to the input of adder 1023. Adder 1023 is further coupled to the output of delay 1013 and the input of delay 1014. Inverter 1005 represents the implementation of reference value PA15. The output of inverter 1005 is coupled to the input of adder 1024. Adder 1024 is further coupled to the output of delay 1014. The output of adder 1024 is the output of the stage 1060A. This output is the output of first cross correlator stage 810 of FIG. 8.

The output of stage 1060A is coupled to the input of inverters 1031 through 1035. Inverter 1031 represents the implementation of reference value PB0. In one embodiment, reference value PB0 is the first one-bit quantized reference value of a second component or portion of the reference pattern. The output of inverter 1031 is coupled to the input of delay 1041. Inverter 1032 represents the implementation of reference value PB1. The output of inverter 1032 is coupled to the input of adder 1051. Adder 1051 is further coupled to the output of delay 1041 and the input of delay 1042. Inverter 1033 represents the implementation of reference value PB2. The output of inverter 1033 is coupled to the input of adder 1052. Adder 1052 is further coupled to the output of delay 1042 and the input of delay 1043. Inverter 1034 represents the implementation of reference value PB6. The output of inverter 1034 is coupled to the input of adder 1053. Adder 1053 is further coupled to the output of delay 1043 and the input of delay 1044. Inverter 1035 represents the implementation of reference value PB7. The output of inverter 1035 is coupled to the input of adder 1054. Adder 1054 is further coupled to the output of delay 1044 and the output of stage 1060B and circuit 1000.

During the first clock cycle, the plurality of inverters 1001 through 1005 receive the first sample of the incoming signal ("i0"). For example, inverter 1001 receives the input signal and processes the input signal in accordance with the reference value PA0. In one embodiment, the reference value may be used as an enable for the inverter, for example. If the inverter is not enabled (e.g., PA0=0), the input i0 is passed through. However, if the inverter is enabled (e.g., PA0=1), then the input i0 is inverted as it passed through. As mentioned above, the inverters are representative of a binary implementation of a reference pattern. In other embodiments, a pattern value of +1 may be hardwired as a buffer or the lack of an inverter, and a pattern value of −1 (Pn=−1) may be hardwired using an inverter, for example. The output of inverter 1001 is received by delay element 1011, while inverters 1002 through 1005 are received by adders 1021 through 1024. In this example, delays 1011 through 1014 delay the value received at the input for eight clock cycles. Since the delays are able to delay the input for eight clock cycles, they are able to store eight different sets of values within each delay element. Therefore, results from inverters 1001 through 1004 for the first input sample may not affect the output of stage 1060A until the system reaches a clock cycle that is a multiple of eight beginning from the first sample (i.e., the $8^{th}$, $16^{th}$, and $24^{th}$ clock cycle etc . . . ). For example, the result of inverter 1001 on the first sample i0 will be received by adder 1021 eight clock cycles after i0 is received. Similarly, values for inverters 1001 through 1004 from the second input sample may not affect the output of stage 1060A until the system reaches a clock cycle that is a multiple of eight beginning with this sample ($9^{th}$, $17^{th}$, $25^{th}$, etc . . . clock cycle). Accordingly, the result transmitted from the output of stage 1060A for the first eight samples is the result of PA15 (inverter 1005). After eight samples, the output is the combined result of PA15 and PA14. It can be seen that the result of PA0 on the first sample i0 will influence the output of stage 1060A after N(M−1) cycles after the first sample i0 is received, where M is the number of pattern values in stage 1060A, M−1 is the number of delays, and N is the delay value of each delay (and the number of pattern values in stage 1060B). Here, M=16 and N=8. Thus, the result of PA0 on the first sample i0 will influence the output after (16−1)(8)=120 cycles after the first sample i0 is received.

The output of stage 1060A is then received by stage 1060B by inverters 1031 through 1035. Stage 1060B's functionality is similar to stage 1060A. The main difference between the two stages is that delay elements 1041 through 1044 are one clock cycle delay elements in stage 1060B while delay elements 1011 through 1014 are eight clock cycle delay elements in stage 1060A. Similar to stage 1060A, inverters 1031 through 1035 receive the output of stage 1060A along with a reference value. The results of inverters 1031 through 1034 enter one cycle delay elements 1041 through 1044 and will remain there until the following clock cycle. The result of inverter 1035 may be combined with the delayed value stored in delay element 1044 in adder 1054. The output of adder 1054 is the output of circuit 1000. Here, the output of circuit 1000 for the first input sample i0 is equal to the result of the input sample inverted by inverter 1005 and inverter 1035.

In the next cycle, the second sample of the incoming signal is received by inverters 1001 through 1005. Delay elements 1011 through 1014 will store the results from the second sample for eight clock cycles. Therefore, the results from the second sample stored within delays 1011 through 1014 will not affect the output of circuit 1000 until the ninth clock cycle. The result from stage 1060A for the second sample of the incoming signal will be the second sample i1 combined with PA15, which is represented here as the result generated from inverter 1005.

The second output result of stage 1060B is the second input sample i1 through inverter 1005 and inverter 1035 added with the output of delay 1044, which is the first input sample through inverter 1005 and inverter 1034. As more samples are received, the values stored within the delays of circuit 1000 may combine with results from inverters and propagate to the output of circuit 1000. This process may continue as streams of input data samples are received and processed by circuit 1000. It can be seen that the first complete cross correlation result will occur M*N cycles after the first input i0 is received. In this example, the first stage includes M=16 pattern values and the second stage includes N=8 pattern values. Accordingly, the first cross correlation peak may occur after 128 cycles. Therefore, if the incoming signal is highly correlated with the reference pattern of circuit 1000, a correlation peak may be found in the output after 128 samples of the incoming signal have been processed.

Figure 11:
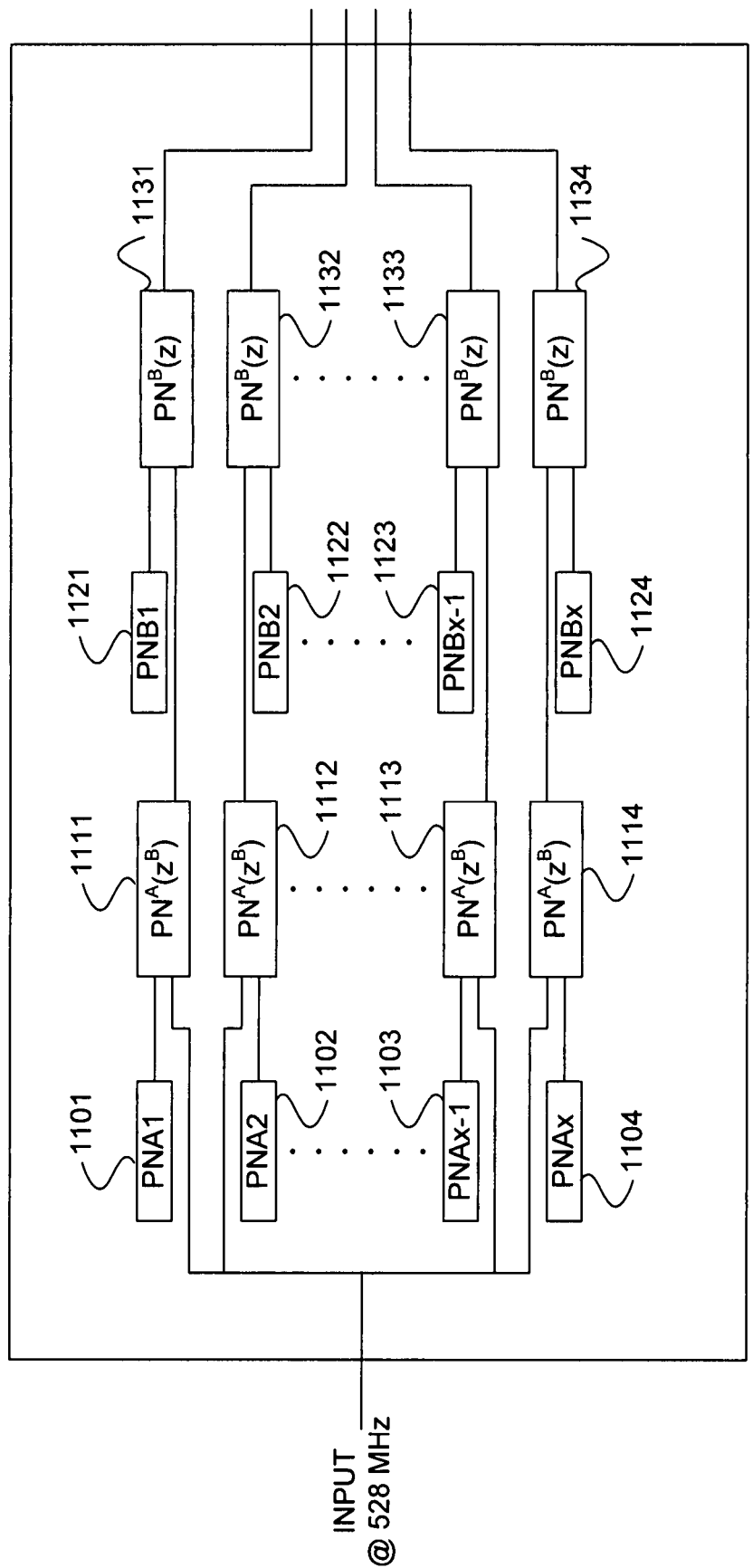
FIG. 11 illustrates a cross correlation system according to one embodiment of the present invention.

FIG. 11 illustrates a cross correlator system according to one embodiment of the present invention. System 1100 cross correlates an input signal against a plurality of reference patterns to determine the correlation between each reference pattern and the input signal. In one embodiment, these reference patterns are PN sequences, for example. System 1100 transmits an input signal to cross correlator stages 1111 through 1114. In one embodiment, stages 1111 through 1114 are similar to stage 1060A of cross correlator 1000 described in FIG. 10. In this embodiment, each reference pattern is configured as described in FIG. 10 and distributed between two stages. For example, cross correlator stage 1111 receives a first PN sequence component 1101 as an input. Similarly, cross correlator stage 1112 receives PN sequence component 1102 as an input, cross correlator stage 1113 receives PN sequence component 1103 as an input, and cross correlator stage 1114 receives PN sequence component 1104 as an input. The results of cross correlator stages 1111 through 1114 are then received by a second set of cross correlator stages 1131 through 1134, which are coupled to the second components of the PN sequences. In one embodiment, cross correlators 1131 through 1134 are similar to stage 1060B of cross correlator 1000 described in FIG. 10. Cross correlator stage 1131 receives the output from cross correlator stage 1111 along with a second PN sequence component 1121. Similarly, cross correlator stage 1132 receives the output from cross correlator stage 1112 along with PN sequence component 1122, cross correlator stage 1133 receives the output from cross correlator stage 1113 along with PN sequence component 1123, and cross correlator stage 1134 receives the output from cross correlator stage 1114 and PN sequence component 1124. The results from cross correlator stages 1131 through 1134 are then transmitted as outputs of system 1100.

Figure 12:
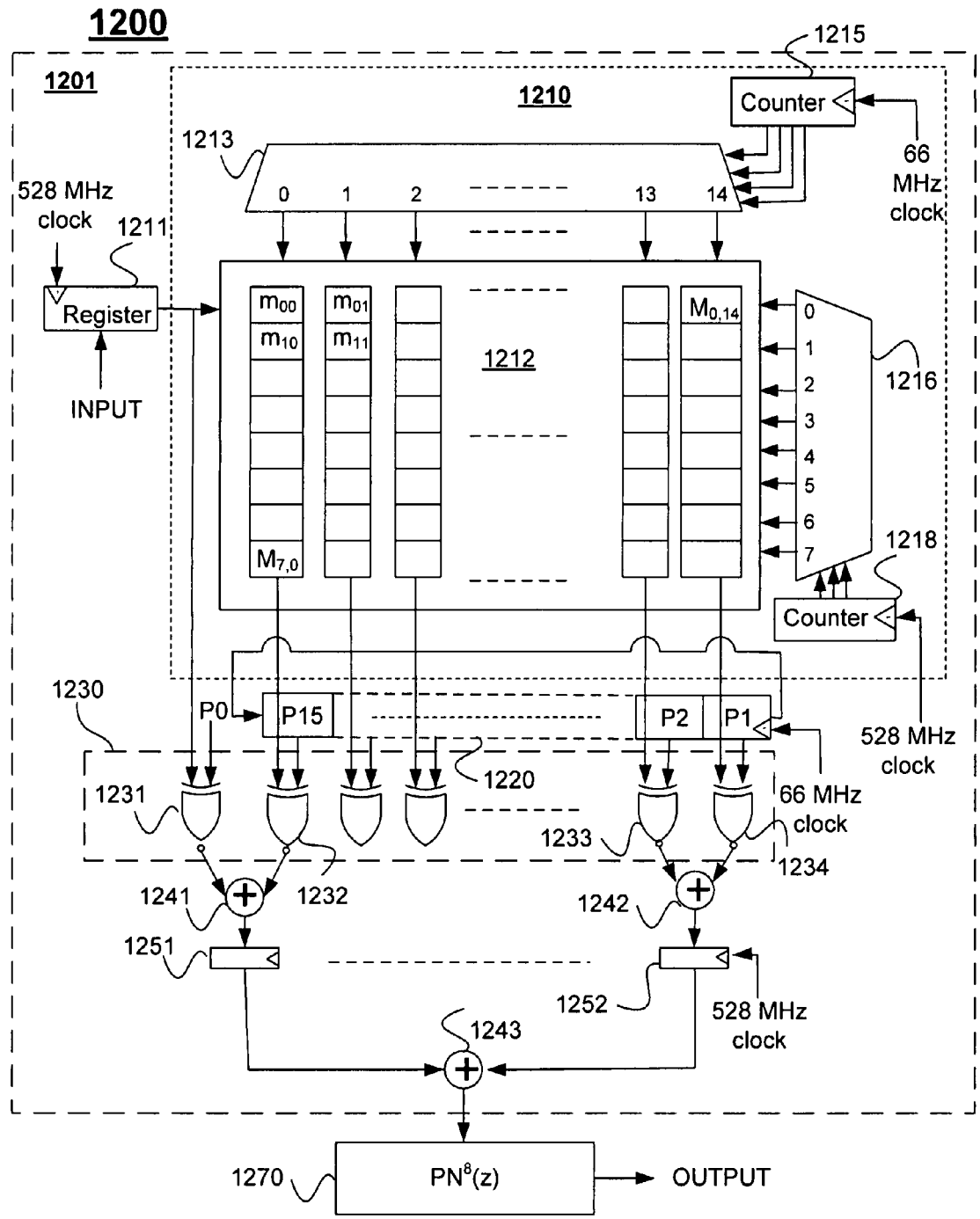
FIG. 12 illustrates a cross correlator circuit according to one embodiment of the present invention.

FIG. 12 illustrates a cross correlator circuit according to one embodiment of the present invention. Similar to circuit 1000 illustrated in FIG. 10, circuit 1200 comprises two cross correlator stages. The input of circuit 1200 is coupled to the input of the first cross correlator stage 1201, the output of the first cross correlator stage is coupled to the input of the second cross correlator stage 1270, and the output of the second cross correlator stage is the output of circuit 1200. The first cross correlator stage 1201 includes an input register 1211, a memory core 1210, storage element 1220 for storing reference pattern values, logic circuits 1230 for combining the stored digital data values with the stored reference pattern values, and a summing network. In this example, storage element 1220 is a shift register, and logic circuits are programmable inverters implemented using XOR gates 1231 through 1234, and the summing network includes an array of adders 1241 through 1243 and a corresponding array of registers 1251 through 1252. In one embodiment, memory core 1210 includes memory storage 1212, column decoder 1213, column control counter 1215, row decoder 1216, and row control counter 1218. The second cross correlator stage 1270 may be implemented in a number of ways. In one embodiment, the second cross correlator stage 1270 is similar to circuit 1060B of FIG. 10, for example.

Register 1211 is coupled to the input of the first cross correlator for receiving samples of the input signal. In this example, samples are received at a rate of 528 Mhz. The output of register 1211 is coupled to an input of memory storage array 1212 where the samples are stored. In one embodiment, the memory comprises an array of memory elements, such as an array of elements (e.g., m00, m10, ..., m7,0, m10, m11, ..., m0,14, ...). In this example, the memory is an 8×15 array including 120 memory elements each capable of storing an n-bit signal value. The location where a given sample is written in memory array 1212 may be set by column decoder 1213 and row decoder 1216. In this example, column decoder 1213 is controlled by counter 1215 while row decoder 1216 is controlled by counter 1218. In one embodiment, counter 1215 is clocked at a lower frequency than counter 1218, thereby allowing samples to be written row-by row into each column before moving to the next column. This allows received digital data values to be stored in memory 1212 row-by-row in a plurality of successive columns. For example, the first sample (i0) may be written in column 0, row 0. Similarly, the second sample (i1) may be written in column 0, row 1 while the $9^{th}$ sample (i8) may be written in column 1, row 0. In this example, counter 1218 receives a clock having the same frequency as the input register 1211 (e.g., 528 MHz—the data rate) so that sample values are loaded into successive rows in each column as they are received. For a two stage cross correlator architecture of FIG. 8, column control counter 1215 receives a clock having a frequency that is an integer fraction (1/M) of the frequency provided to row control counter 1218. In this example, a two stage cross correlator architecture with N=16 and M=8 may be implemented using 8 rows and 15 columns. Accordingly, column control counter 1215 may receive a clock signal having a frequency of $\frac{1}{8}^{th}$ the frequency (e.g., 66 MHz) provided to the row control counter 1218. Therefore, incoming signal samples will be stored successively row-by-row and then column-by-column in memory array 1212.

In this example, data samples at the output of register 1211 and samples stored in memory 1212 are coupled to first inputs of XOR gates 1231 through 1234. The other inputs of the XOR gates are coupled to receive a reference pattern, such as the first component of a PN sequence reference pattern, for example. In this example, a first input of XOR gate 1231 is coupled to the output of input register 1211 to receive each incoming data sample. The second input of XOR gate 1231 is coupled to the first reference pattern value (P0). The other XOR gates 1232-1234 each have a first input coupled to a column output of memory core 1210. In this example, XOR 1232 will receive the values from the first column (column 0) in memory 1212, and the column outputs are similarly coupled to an input of an XOR gate up to XOR 1234, which will receive the values from the last column (column 14). Since the row decoder 1216 is controlled by a counter 1218, the row values in each column will be successively coupled to the inputs of the XOR gates on each cycle of counter 1218. For instance, on a first cycle of counter 1218, memory element m00 in row 0/column 0, memory element m01 in row 0/column 1, and all the other row 0 elements in each column up to the last column will be selected and coupled to inputs of corresponding XOR gates. On the next cycle of 1218, memory element m10 in row 1/column 0, memory element m11 in row 1/column 1, and all the other row 1 elements in each column up to the last column will be selected and coupled to inputs of corresponding XOR gates.

The other inputs of the XOR gates are coupled to data storage elements 1220. The storage elements may store the reference pattern values P1-P15. In this example, register 1220 may be a shift register. Accordingly, when the first signal sample (i0) appears at the output of register 1211 on a first cycle, such sample (i0) will be XOR'd with P0 (i.e., P0 controls whether i0 is inverted or not as in FIG. 10). On the next cycle, i0 is stored in memory element m00 and the second sample (i1) is XOR'd with P0. After 8 cycles, the first column (column 0) of memory 1212 is filled up with input samples and column control counter 1215 increments to the next column (column 1), row control counter 1218 returns to the first row (row 0), and the reference pattern is reconfigured for subsequent combination with received data. In this example, the shift register 1220 shifts the reference values. Thus, shift register may be clocked at a frequency of 1/Mth the frequency at which the digital data is loaded into memory (e.g., 66 MHz). In this example, reference value P1 is shifted to be coincident with the first column (col 0). Accordingly, when the ninth sample (i8) appears at the output of register 1211 and is coupled to XOR 1231, row 0 (i0) is coupled to XOR 1232, and the XOR'd values will be summed by adders 1241-1243 and intermediate result registers 1251-1252 to produce an output of stage 1201 as follows:

i8*P0+i0*P1

The ninth sample received will be stored in memory element m01. Similarly, the tenth sample (i9) through the sixteenth sample (i15) will be stored in successive rows in the second column as counter 1218 is clocked. The resulting outputs for each of these samples will be as follows:

i9*P0+i1*P1 i10*P0+i2*P1 i15*P0+i7*P1.

Accordingly, as input data samples are received, the memory is accessed row-by-row so that samples at the output of register 1211 are XOR'd with P0 and added to the XOR results of samples received 8 cycles earlier. After all the previously stored values in the rows in a column have been accessed and processed, the values in register 1220 may be shifted for the next sequence. It is to be understood that other techniques than a shift register for reconfiguring inputs to logic 1230 could be used, such as, for example, an array of switches between storage element 1220 and logic 1230, or other memory reconfiguration techniques for moving the reference pattern values to the appropriate locations. This example illustrates an implementation of stage 1060A in FIG. 10 with 8-cycle delays ($z^{-8}$) using eight rows in each column of memory 1212. Accordingly, when the one-hundred and twenty first sample is received (i120), the output of stage 1201 is:

i120*P0+i112*P1+ . . . +i16*P13+i8*P14+i0*P15.

Similarly, when the one-hundred and twenty seventh sample is received (i127), the output of stage 1201 is:

i127*P0+i119*P1+ . . . +i15*P14+i7*P15.

Thus, this example cross correlator may be used to determine the correlation between a 128 sample signal and a reference pattern. It is to be understood that other implementations and embodiments may include different configurations for performing cross correlations of other lengths or at different frequencies.

Figure 13:
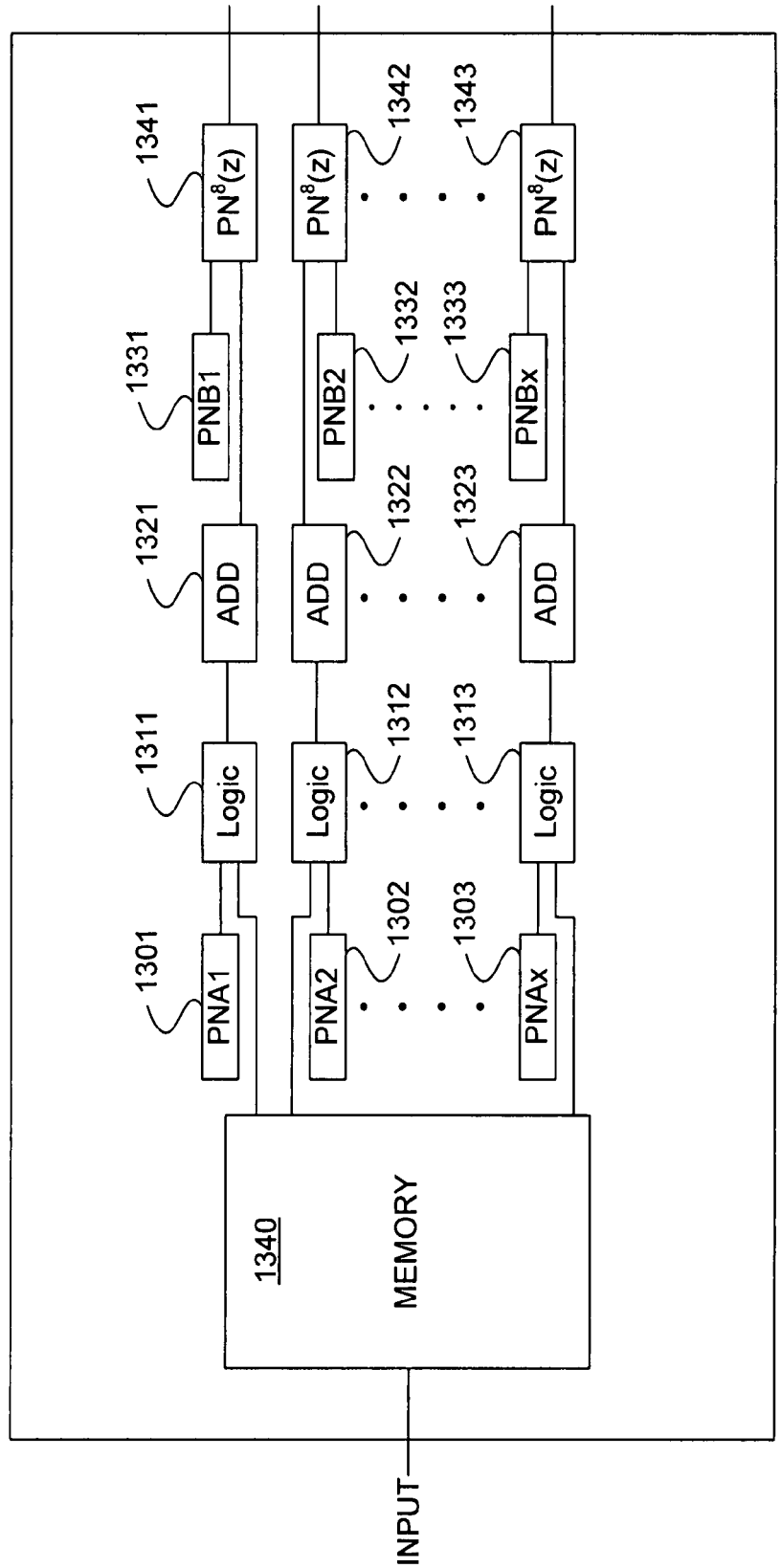
FIG. 13 illustrates a cross correlation system according to one embodiment of the present invention.

FIG. 13 illustrates a cross correlator system according to one embodiment of the present invention. System 1300 cross correlates an input signal against a plurality of reference patterns. System 1300 includes a memory core 1340, controlled inverters implemented using XOR circuits 1311-1313, adder networks 1321-1323, and a second stages 1341-1343. System 1300 receives an input signal comprising a plurality of samples in memory core 1340. Memory core 1340 stores samples from the input signal into a memory array, allowing the samples to be shared between various cross correlators. In a system similar to system 1100 of FIG. 11, delay elements within each cross correlator store previous samples of the input signal, and accordingly, the number of delay elements in the system increases proportionally to the number of cross correlators in the system. Therefore, an increase in cross correlators also translates to additional circuitry. In comparison, the complexity of memory 1340 is constant regardless of the number of cross correlator stages coupled to memory core 1340. An increase in the number of cross correlators in the example implementation of system 1300 will only result in a corresponding to an increase in the number of XOR circuits and adders. This results in savings in size and complexity of the entire system.

Memory core 1340 is coupled to XOR gates 1311 through 1313. The other inputs of the XOR gates are coupled to binary reference pattern values. Accordingly, the XOR gates act as controlled inverters that either multiply the input sample values by +1 or −1. The results from the XOR gates are then added together by adders 1321 through 1323. For example, all the XOR gates in XOR 1311 are added together by adder 1321. The results of adders 1321 through 1323 are then received by a plurality of second stages of cross correlators comprising cross correlator stages 1341 through 1343. In one embodiment, cross correlator stages 1341 through 1343 are similar to stage 1060B of cross correlator 1000 described in FIG. 10. Cross correlator stage 1341 receives the output from adder 1321 along with reference pattern values 1331. Similarly, cross correlator stage 1342 receives the output from adder 1322 along with reference pattern values 1332, and cross correlator stage 1343 receives the output from adder 1323 along with reference pattern values 1333. The results from cross correlator stages 1341 through 1343 are then transmitted as outputs of system 1300. Any number of cross correlations may be implemented using memory core 1340, an XOR circuit, an adder network, a second stage, and reference pattern values. As in FIG. 12, a first component of the reference pattern values may be stored in a shift register, for example, and the second component implemented as in stage 1060B in FIG. 10.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims. The terms and expressions that have been employed here are used to describe the various embodiments and examples. These terms and expressions are not to be construed as excluding equivalents of the features shown and described, or portions thereof, it being recognized that various modifications are possible within the scope of the appended claims.

What is claimed is:

1. A communication system comprising:
   a wireless receiver, the wireless receiver receiving a signal including a first sequence of data values and converting the first sequence of data values into a sequence of digital data values, the wireless receiver further comprising a plurality of cross correlators that each receive the digital data values and cross correlate the digital data values with a corresponding plurality of different binary reference patterns,
   wherein if the first sequence of data values correlates with one of said plurality of binary reference patterns, one of said cross correlators generates a peak, and
   wherein each cross correlator of the plurality of cross correlators comprise a first cross correlator stage and a second cross correlator stage, wherein the second cross correlator stage comprises N binary reference pattern values and a plurality of single cycle delays, and wherein the first cross correlator stage comprises M binary reference pattern values and a plurality of N cycles delays, wherein N is a first number and M is a second number.

2. The communication system of claim 1 wherein the second cross correlator stage comprises N-1 delays, and wherein the first cross correlator stage comprises M-1 delays.

3. The communication system of claim 1 wherein binary reference patterns are PN sequences.

4. A communication system comprising:
   a wireless receiver, the wireless receiver receiving a signal including a first sequence of data values and converting the first sequence of data values into a sequence of digital data values, the wireless receiver further comprising a plurality of cross correlators that each receive the digital data values and cross correlate the digital data values with a corresponding plurality of different binary reference patterns,
   wherein if the first sequence of data values correlates with one of said plurality of binary reference patterns, one of said cross correlators generates a peak, and wherein each cross correlator of the plurality of cross correlators comprise:
      a first cross correlator stage comprising:
         a memory coupled to receive the digital data values;
         a register for storing a first plurality of binary reference pattern values; and
         a plurality of XOR gates, wherein each XOR gate has a first input coupled to receive a digital data value and a second input coupled to receive a binary reference pattern value; and
         a summing network coupled to the plurality of XOR gates; and
      a second cross correlator stage coupled the summing network, wherein the second cross correlator stage comprises N binary reference pattern values and a plurality of single cycle delays, and wherein the first cross correlator stage comprises M binary reference pattern values and implements N cycle delays, wherein N is a first number and M is a second number.

5. The communication system of claim 4 wherein the register is a shift register.

6. The communication system of claim 5 wherein the memory receives digital data at a first frequency and wherein the shift register is clocked at a frequency of 1/Mth the first frequency.

7. The communication system of claim 4 wherein received digital data values are stored in said memory row-by-row in a plurality of successive columns.

8. A communication system comprising:
   a wireless receiver, the wireless receiver receiving a signal including a first sequence of data values and converting the first sequence of data values into a sequence of digital data values, the wireless receiver further comprising a plurality of cross correlators that each receive the digital data values and cross correlate the digital data values with a corresponding plurality of different binary reference patterns,
   wherein if the first sequence of data values correlates with one of said plurality of binary reference patterns, one of said cross correlators generates a peak, and
   wherein each cross correlator of the plurality of cross correlators comprise a first cross correlator stage comprising:
      a memory coupled to receive the digital data values;
      a register for storing a first plurality of binary reference pattern values; and
      a plurality of XOR gates, wherein each XOR gate has a first input coupled to receive a digital data value and a second input coupled to receive a binary reference pattern value, and
   wherein rows of said memory are successively coupled to a first plurality of XOR gate inputs and the plurality of reference values are coupled to a second plurality of XOR gate inputs, and wherein said shift register is shifted after all the rows in said memory have been processed.

9. A communication system comprising:
   a wireless receiver, the wireless receiver receiving a signal including a first sequence of data values and converting the first sequence of data values into a sequence of digital data values, the wireless receiver further comprising a plurality of cross correlators that each receive the digital data values and cross correlate the digital data values with a corresponding plurality of different binary reference patterns,
   wherein if the first sequence of data values correlates with one of said plurality of binary reference patterns, one of said cross correlators generates a peak, and
   wherein each cross correlator of the plurality of cross correlators comprise a first cross correlator stage comprising:
      a memory coupled to receive the digital data values;
      a register for storing a first plurality of binary reference pattern values; and
      a plurality of XOR gates, wherein each XOR gate has a first input coupled to receive a digital data value and a second input coupled to receive a binary reference pattern value, and
   wherein the memory further comprises a row control counter clocked at a first frequency and a column control counter clocked at a frequency of 1/Mth the first frequency, wherein M is a number.

10. A cross correlator for use in a communication system comprising:
   a memory for receiving and storing digital data values;
   one or more data storage elements for storing reference pattern values, wherein the data storage elements comprise one or more shift registers;
   one or more logic circuits for combining the stored digital data values with the stored reference pattern values; and
   one or more summing networks coupled to the logic circuits; and
   a cross correlator stage coupled the one or more summing networks, wherein the cross correlator stage comprises N binary reference pattern values and a plurality of single cycle delays, and wherein the data storage elements store M binary reference pattern values and are shifted every N cycles, wherein N is a first number and M is a second number.

11. The cross correlator of claim 10 wherein the logic circuits comprise a plurality of XOR gates.

12. The cross correlator of claim 10 wherein the reference pattern values are binary reference pattern values.

13. The cross correlator of claim 10 wherein the memory receives digital data at a first frequency and wherein the shift register is clocked at a second frequency that is an integer fraction of the first frequency.

14. The cross correlator of claim 10 wherein received digital data values are stored in said memory row-by-row in a plurality of successive columns.

15. A cross correlator for use in a communication system comprising:
   a memory for receiving and storing digital data values;
   one or more data storage elements for storing reference pattern values;
   one or more logic circuits for combining the stored digital data values with the stored reference pattern values; and
   one or more summing networks coupled to the logic circuits,
   wherein said memory comprises columns and rows, and wherein the logic circuits each comprise a plurality of XOR gates, and wherein the rows of said memory are successively coupled to a first plurality of XOR gate inputs and the plurality of reference pattern values are coupled to a second plurality of XOR gate inputs, and wherein said reference pattern values are reconfigured after all the rows in said memory have been processed.

16. A cross correlator for use in a communication system comprising:
   a memory for receiving and storing digital data values;
   one or more data storage elements for storing reference pattern values;
   one or more logic circuits for combining the stored digital data values with the stored reference pattern values; and
   one or more summing networks coupled to the logic circuits,
   wherein the memory further comprises a row control counter clocked at a first frequency and a column control counter clocked at a second frequency that is an integer fraction of the first frequency.

17. A cross correlation method comprising:
   sequentially storing digital data values in a memory;
   coupling the digital data values stored in said memory to a plurality of first inputs of a plurality of programmable inverter stages;
   coupling a different first reference pattern to a second input of each of the plurality of programmable inverter stages, wherein each programmable inverter stage generates a plurality of outputs;
   adding the outputs of each of the programmable inverter stages; and
   correlating each added output with a different second reference pattern, wherein each second reference pattern comprises N binary reference pattern values, and wherein each first reference pattern comprises M binary reference pattern values, wherein N is a first number and M is a second number.

18. The method of claim 17 wherein each reference pattern comprises binary values.

19. The method of claim 17 wherein the programmable inverter stages comprise XOR gates.

20. A cross correlation method comprising:
   sequentially storing digital data values in a memory;
   coupling the digital data values stored in said memory to a plurality of first inputs of a plurality of programmable inverter stages;
   coupling a different first reference pattern to a second input of each of the plurality of programmable inverter stages, wherein each programmable inverter stage generates a plurality of outputs; and
   adding the outputs of each of the programmable inverter stages,
   wherein the memory receives the digital data values at a first frequency and wherein each first reference pattern received at the second input of each of the plurality of programmable inverter stages is reconfigured at a second frequency that is an integer fraction of the first frequency.

21. The method of claim 20 wherein reconfiguring comprises shifting the first reference pattern in a shift register.

* * * * *